(12) United States Patent
Ramsey et al.

(10) Patent No.: US 7,689,453 B2
(45) Date of Patent: *Mar. 30, 2010

(54) CAPTURING MARKETING EVENTS AND DATA MODELS

(75) Inventors: Mark S. Ramsey, Colleyville, TX (US); David A. Selby, Nr Fareham (GB)

(73) Assignee: International Business Machines Corporation, Armonk, NY (US)

( * ) Notice: Subject to any disclaimer, the term of this patent is extended or adjusted under 35 U.S.C. 154(b) by 1255 days.

This patent is subject to a terminal disclaimer.

(21) Appl. No.: 11/120,570

(22) Filed: May 3, 2005

(65) Prior Publication Data

US 2006/0253467 A1    Nov. 9, 2006

(51) Int. Cl.
*G06F 17/30* (2006.01)

(52) U.S. Cl. .............................. 705/10; 705/8; 705/26; 707/1; 707/100

(58) Field of Classification Search ........................ None
See application file for complete search history.

(56) References Cited

U.S. PATENT DOCUMENTS

| | | | | |
|---|---|---|---|---|
| 5,930,764 | A * | 7/1999 | Melchione et al. | 705/10 |
| 5,966,695 | A * | 10/1999 | Melchione et al. | 705/10 |
| 6,236,977 | B1 * | 5/2001 | Verba et al. | 705/10 |
| 6,484,163 | B1 | 11/2002 | Lawrence et al. | |
| 6,567,786 | B1 | 5/2003 | Bibelnieks et al. | |
| 6,847,934 | B1 * | 1/2005 | Lin et al. | 705/10 |
| 6,882,985 | B1 * | 4/2005 | Kay et al. | 705/37 |
| 6,925,441 | B1 * | 8/2005 | Jones et al. | 705/10 |
| 7,007,088 | B1 * | 2/2006 | Najmi | 709/225 |
| 7,133,834 | B1 * | 11/2006 | Abelow | 705/10 |
| 7,194,448 | B2 * | 3/2007 | Luth et al. | 707/1 |

(Continued)

FOREIGN PATENT DOCUMENTS

WO    WO 9922328 A1    6/1999

(Continued)

OTHER PUBLICATIONS

Peter R Dickson, Paul W Farris, & Willem J M I Verbeke. (2001). Dynamic strategic thinking. Academy of Marketing Science. Journal, 29(3), 216-237.*

(Continued)

*Primary Examiner*—Bradley B Bayat
*Assistant Examiner*—Gurkanwaljit Singh
(74) *Attorney, Agent, or Firm*—Schmeiser, Olsen & Watts; Anna Linne (57) ABSTRACT

A database system and method applying data models to candidate(s) with respect to marketing event(s). The database system comprises a first database structure storing a first list of candidates, a second database structure storing a plurality of data models, a third database structure storing a second list identifying marketing events, and a database manager software application stored on a computer readable medium. The database manager software application comprises a retrieving tool and an application tool. The retrieving tool is for retrieving at least one data model from the data models in said second database structure. The application tool is for applying the at least one data model to the at least one candidate from the first list of candidates with respect to a first marketing event from the second list.

22 Claims, 3 Drawing Sheets

U.S. PATENT DOCUMENTS

| | | | |
|---|---|---|---|
| 7,216,109 B1* | 5/2007 | Donner | 705/64 |
| 7,222,078 B2* | 5/2007 | Abelow | 705/1 |
| 7,280,975 B1* | 10/2007 | Donner | 705/10 |
| 7,364,068 B1* | 4/2008 | Strubbe et al. | 235/376 |
| 7,386,517 B1* | 6/2008 | Donner | 705/75 |
| 2001/0037212 A1* | 11/2001 | Motosuna et al. | 705/1 |
| 2002/0026356 A1* | 2/2002 | Bergh et al. | 705/14 |
| 2002/0040352 A1* | 4/2002 | McCormick | 705/80 |
| 2002/0165771 A1* | 11/2002 | Walker et al. | 705/14 |
| 2003/0083936 A1* | 5/2003 | Mueller et al. | 705/14 |
| 2003/0084053 A1* | 5/2003 | Govrin et al. | 707/100 |
| 2003/0120584 A1 | 6/2003 | Zarefoss et al. | |
| 2003/0140282 A1 | 7/2003 | Kaler | |
| 2003/0208402 A1* | 11/2003 | Bibelnieks et al. | 705/14 |
| 2003/0229536 A1* | 12/2003 | House et al. | 705/10 |
| 2004/0073496 A1* | 4/2004 | Cohen | 705/26 |
| 2004/0078273 A1* | 4/2004 | Loeb et al. | 705/26 |
| 2004/0093296 A1* | 5/2004 | Phelan et al. | 705/36 |
| 2004/0103017 A1* | 5/2004 | Reed et al. | 705/10 |
| 2004/0103051 A1* | 5/2004 | Reed et al. | 705/36 |
| 2005/0038893 A1* | 2/2005 | Graham | 709/228 |
| 2005/0055275 A1* | 3/2005 | Newman et al. | 705/14 |
| 2005/0071223 A1* | 3/2005 | Jain et al. | 705/14 |
| 2005/0096950 A1* | 5/2005 | Caplan et al. | 705/7 |
| 2005/0137939 A1* | 6/2005 | Calabria et al. | 705/26 |
| 2005/0144065 A1* | 6/2005 | Calabria et al. | 705/14 |
| 2005/0153317 A1* | 7/2005 | DeNise et al. | 435/6 |
| 2005/0154630 A1* | 7/2005 | Lin et al. | 705/10 |
| 2005/0222906 A1* | 10/2005 | Chen | 705/14 |
| 2006/0047563 A1* | 3/2006 | Wardell | 705/10 |
| 2006/0161474 A1* | 7/2006 | Diamond et al. | 705/14 |
| 2006/0247973 A1* | 11/2006 | Mueller et al. | 705/14 |

FOREIGN PATENT DOCUMENTS

| | | |
|---|---|---|
| WO | WO 03093930 A2 | 11/2003 |

OTHER PUBLICATIONS

Drury Jenkins. (Aug. 1999). Customer relationship management and the data warehouse. Call Center Solutions, 18(2), 88-92.*

Marla Royne Stafford. (2005). International Services Advertising (ISA): Defining the Domain and Reviewing the Literature. Journal of Advertising, 34(1), 65-86.*

Woodside, Arch G. "Modeling Linkage-Advertising: Going Beyond Better Media Comparisons" Journal of Advertising Research; Jul./Aug. 1994, vol. 34 Issue 4, p. 22-31, 10p.*

Shaun Doyle. (2005). Real-time technologies in marketing—Interaction management. Journal of Database Marketing & Customer Strategy Management, 12(3), 272-278.*

Honomichl 50: 1998 Business Report on the Marketing Research Industry. (Jun. 1998).*

Steven Stern, & Douglas Barton. (1997). Putting the "custom" in customer with database marketing. Strategy & Leadership, 25(3), 46-50.*

Portuese, Daniela (2006). E-commerce and the Internet: A study on the impact of relationship marketing opportunities for better online consumer intentional relationship. Ph.D. dissertation, Capella University, United States—Minnesota.*

"A database approach to cross selling in the banking industry: Practices, Strategies, and Challenges." Kin-nam Lau; Haily Chow; Connie Liu; Journal of Database Marketing & Customer Strategy Management; Apr. 2004; 11, 3; ABI/INFORM Global p. 216.*

"Adoption of Internet Banking Among Sophisticated Consumer Segments in an Advanced Developing Country" Serkan Akinci; Safak Aksoy; Eda Atilgan; The International Journal of Bank Marketing; 2004; 22, 2/3; ABI/INFORM Global; p. 212.*

"Interest and reaction time analysis of credit card offers: Managerial implication of High Level Research Procedures" Howard Moskowitz; Dorit Cohen; Bert Krieger; Samuel Rabino; Journal of Financial Services Marketing; Dec. 2001; 6, 2; ABI/INFORM Global; p. 172.*

"The customer industry" Gordon A Wyner; Marketing Management; Jan./Feb. 2002; 11, 1; ABI/INFORM Global; p. 6.*

* cited by examiner

CAPTURING MARKETING EVENTS AND DATA MODELS

BACKGROUND OF THE INVENTION

1. Technical Field

The present invention relates to a system and associated method for dynamically applying data models to candidate(s) with respect to outbound marketing event(s).

2. Related Art

Selling a plurality of services to a customer typically requires a complicated series of steps. Therefore there exists a need for a simple procedure to sell a plurality of services to a customer.

SUMMARY OF THE INVENTION

The present invention provides a database system, comprising:

a first database structure storing a first list of candidates;

a second database structure storing a plurality of data models;

a third database structure storing a second list identifying marketing events, wherein each marketing event from said second list comprises a marketing offer and an identified channel means for communicating said marketing offer; and a database manager software application stored on a computer readable medium, wherein said database manager software application comprises a retrieving tool and an application tool, wherein said retrieving tool is for retrieving at least one data model from said data models in said second database structure, and wherein said application tool is for applying said at least one data model to at least one candidate from said first list of candidates with respect to a first marketing event from said second list.

The present invention provides a selection method, comprising:

providing a database system comprising a database manager software application stored on a computer readable medium, a first database structure storing a first list of candidates, a second database structure storing a plurality of data models, and a third database structure storing a second list identifying marketing events, wherein said database manager software application comprises a retrieving tool and an application tool, and wherein each marketing event from said second list comprises a marketing offer and an identified channel means for communicating said marketing offer;

retrieving by said retrieving tool, at least one data model from said data models in said second database structure; and applying by said application tool, said at least one data model to at least one candidate from said first list of candidates with respect to a first marketing event from said second list.

The present invention provides process for integrating computing infrastructure, comprising integrating computer-readable code into a computing system, wherein the code in combination with the computing system comprises a database system comprising a database manager software application stored on a computer readable medium, a first database structure storing a first list of candidates, a second database structure storing a plurality of data models, and a third database structure storing a second list identifying marketing events, wherein said database manager software application comprises a retrieving tool and an application tool, and wherein each marketing event from said second list comprises a marketing offer and an identified channel means for communicating said marketing offer, and wherein the code in combination with the computing system is adapted to implement a method for performing the steps of:

retrieving by said retrieving tool, at least one data model from said data models in said second database structure; and applying by said application tool, said at least one data model to at least one candidate from said first list of candidates with respect to a first marketing event from said second list.

The present invention provides a computer program product, comprising a computer usable medium having a computer readable program code embodied therein, said computer readable program code comprising an algorithm adapted to implement a selection method within a database system, said database system comprising a database manager software application stored on a computer readable medium, a first database structure storing a first list of candidates, a second database structure storing a plurality of data models, and a third database structure storing a second list identifying marketing events, wherein said database manager software application comprises a retrieving tool and an application tool, and wherein each marketing event from said second list comprises a marketing offer and an identified channel means for communicating said marketing offer, said method comprising the steps of:

retrieving by said retrieving tool, at least one data model from said data models in said second database structure; and applying by said application tool, said at least one data model to at least one candidate from said first list of candidates with respect to a first marketing event from said second list.

The present invention advantageously provides a system and associated method to implement a simple procedure to sell a plurality of services to a customer.

DETAILED DESCRIPTION OF THE INVENTION

Figure 1:
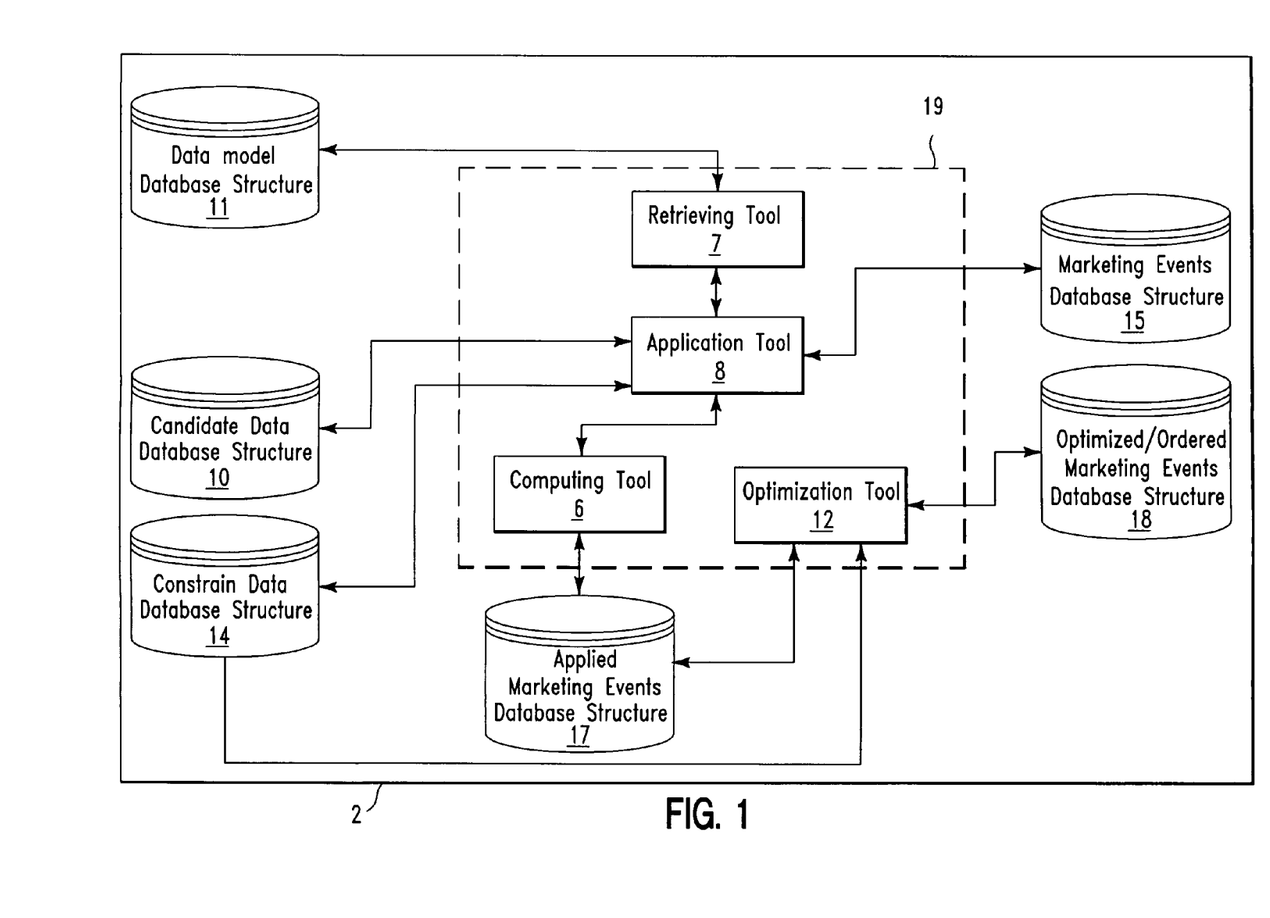
FIG. 1 illustrates a block diagram view of a database system for dynamically applying data models to candidate(s) with respect to outbound marketing event(s) and ordering the marketing events for offering to the candidate(s), in accordance with embodiments of the present invention.

FIG. 1 illustrates a block diagram view of a database system 2 for dynamically applying data models to candidate(s) with respect to outbound marketing event(s) and ordering the marketing events for offering to the candidate(s), in accordance with embodiments of the present invention. A marketing event is defined herein as a marketing offer and an identified channel means for communicating the marketing offer to a candidate. For example, a marketing event may comprise a 1.9% APR introductory interest rate for a 12 month period on a credit card, delivered to the candidate through direct mail. A marketing event may either comprise a growth (new marketing offer) marketing event or a retention (existing product like an existing credit card to be retained) marketing event. A marketing offer is defined herein as an offer from an entity (e.g., a business) for a product or service to be extended to a customer or potential customer (i.e., candidate). The product or service may comprise an incentive to entice the customer or potential customer to accept the offer. For example, the marketing offer may comprise a credit card offer that will provide an APR that is lower than the normal for a specified period of time as an incentive, such as, inter alia, 1.9% APR for the first 12 months if the credit card is accepted. A candidate may be an existing customer of the entity and a potential customer for the marketing offer. For example, an individual, a business, etc. A channel is a means to contact the candidate. For example, e-mail, direct mail, text message, telephone, etc. An outbound marketing event comprises a marketing event where an initial contact is made by an entity to offer the marketing event to a candidate. The database system 2 is used by an entity (e.g., a business such as a bank) comprising an existing customer database to apply data models to candidates from the existing customer database with respect to outbound marketing events (herein referred to marketing events) and sequentially order and optimize the marketing events for offering to the candidates from the existing customer database. The database system 2 comprises database structures 10, 11, 14, 15, 17, and 18 and a database manager software application 19. The database manager software application 19 is a single database manager software application (i.e., one software application as opposed to multiple software applications). The database manager software application 19 may comprise any type of database management software application including, inter alia, DB2 database management system by IBM, etc. The database manager software application 19 comprises a retrieving tool 7, an application tool 8, a computing tool 6, and an optimization tool 12 (i.e., software components). Using a single database manager software application (i.e., database manager software application 19) comprising multiple software components (i.e., retrieving tool 7, application tool 8, computing tool 6, optimization tool 12, etc) is advantageous over using a plurality of individual database manager software applications (e.g., a first individual database manager software application comprising a retrieving tool, a second individual database manager software application comprising an application tool, a third individual database manager software application comprising a computing tool, and a fourth individual database manager software application comprising an optimization tool) because communications between components of single database manager software application (e.g., retrieving tool 7, application tool 8, computing tool 6, and optimization tool 12) are faster and more efficient than communications between multiple individual database manager software applications. Communications between components of a single database manager software application are faster and more efficient than communications between multiple individual database manager software applications because data (for manipulation) only has to be moved within a single software application and does not have to be moved from one software application to another software application. Therefore functions performed on the data (e.g., calculations, optimizations, etc) are performed faster and more efficiently by a single database manager software application than by multiple database manager software applications. Each of database structures 10, 11, 14, 15, 17, and 18 may be individual database structures within the database system 2. Alternatively, each of database structures 10, 11, 14, 15, 17, and 18 may be tables or sections within a single database structure (e.g., as illustrated in FIG. 1). Database structure 10 comprises a list of candidates for marketing events. Database structure 10 additionally comprises a predetermined total budget for each candidate from the list of candidates regarding an amount of money that the entity offering the marketing events is willing to spend to offer a plurality of marketing events to the candidate. Database structure 11 comprises data models that are constructed using mathematical methods. The mathematical methods use customer (i.e., candidate) data such as, inter alia, past history data (e.g., credit card balances, past spending habits, etc.) to construct the data models. The customer (i.e., candidate) data comprises information about all of the entity's customers, current or prospective. This data may be compiled from any standard source including, inter alia, an existing marketing database containing data regarding active customers of the entity. The customer data primarily comprises behavioral data (e.g., purchasing history, returned-items history, payment history, etc), promotional (i.e., marketing events) history (e.g., past marketing events offered to a candidate including information regarding which marketing events were accepted by the candidate), and demographic data regarding the candidate. Database structure 15 comprises marketing events for offering to the candidates from database structure 10. Database structure 15 additionally comprises drop date data for each of the marketing events. A drop date is an origin date for offering the marketing events. Database structure 14 comprises constraint data regarding the marketing event(s) as applied to a candidate. Constraint data comprises constraints that are associated with offering a marketing event to a candidate. For example, constraint data may include, inter alia, an amount of money regarding execution costs for offering the marketing event to a candidate (i.e., an amount that the entity has determined that they are willing is to spend to offer the marketing event to the candidate), a maximum number of offerings for a marketing event (e.g., how many times a marketing event is offered to a candidate), timing between offers, etc. Execution costs comprise costs associated with using each of the channels associated with the marketing offers from the marketing events. Execution costs may comprise, inter alia, costs for promotional materials, mailing costs, telemarketing costs, infrastructure costs, etc. The retrieving tool 7 retrieves a data model(s) from the database structure 11. The application tool 8 applies the data model(s) to at least one candidate from the database structure 10 with respect to a marketing event(s) the database structure 15. Additionally, the application tool 8 may apply constraint data from the database structure 14 to the marketing event(s) from the database structure 15 with respect to the at least one candidate from the database structure 10. The computing tool 6 uses the data from database structures 10, 11, 14, and 15 and processed by the application tool 8 to compute response probability scores and ranking scores for each of the marketing events from database structure 15 with respect to each of the candidates from database structure 10. The database structure 15 additionally comprises a predetermined value score associated with each marketing offer within each marketing event. A value score is a numerical score (e.g., in dollars) representing an expected profit gain to be produced by a marketing offer from a candidate accepting and executing the marketing offer. The response probability scores are for determining a probability that a candidate(s) will respond to each of the marketing events. In other words, the response probability scores determine a probability that a candidate will respond to and accept a marketing event within a specified time frame. The response probability scores are calculated using the data model(s) (i.e., from database structure 11) comprising any candidate past history data (e.g., credit card balances, past spending habits, etc.). The ranking score is computed as a function of a value score with respect to a response probability score (e.g., by multiplying a value score for a marketing event with a response probability score for a candidate). Each ranking score is associated with a marketing event for a specific candidate. The ranking scores are used to order the marketing events from highest rank to lowest rank to determine an order in which to offer the plurality of marketing events to the specific candidate. A list comprising the ranked marketing events for the at least one candidate is stored in database structure 17. The list may be used to offer the marketing events to the at least one candidate. If it is determined that the ranked marketing events for the at least one candidate should be optimized, the optimization tool 12 may be executed to sort the ranking scores for the marketing events from database structure 17 (e.g., from highest rank to lowest rank) for the at least one candidate and a second ranking list is created. The optimization tool 12 may use data from the database structure 14 to apply constraint data (e.g., timing constraints, budget constraints, etc.) to each of the ranking scores on the ranking list for a candidate. The optimization tool 12 applies timing constraints to each of the ranking scores for each of the candidates. The timing constraints eliminate any marketing events that comprise timing conflicts between marketing events. For example, the optimization tool 12 will take the highest ranked marketing event (first marketing event) and compare it to the next highest ranked marketing event (second marketing event). If the two marketing events comprise a same type of marketing event (e.g., both marketing events comprise a credit card offer), then the optimization tool looks for a timing conflict. For example if the first marketing event is to be offered to the candidate every 30 days and the second marketing event is to be offered every 30 days then the second marketing event is eliminated from the ranking list because the two marketing events are same type of marketing event and should not be received by the candidate at the same time. The optimization tool 12 will continue to apply the timing constraints to each of the marketing events on the ranking list. Marketing events comprising timing conflicts are eliminated from the ranking list. The optimization tool 12 then applies monetary (i.e., budget) constraints to the value scores that remain on the ranking list and subtracts the monetary constraints from the predetermined budgeted execution costs for offering the marketing event to the candidate. The predetermined budgeted amount comprises an amount of money for execution costs that the entity has determined that they are willing is to spend to offer a plurality of marketing events to the candidate. For example, each time a marketing event is offered to a candidate, the execution costs are deducted from the budgeted amount, and once the budget is exceeded, the optimization tool 12 will eliminate any remaining marketing events from the ranking list. A final ranking list comprises a list of marketing events that have not been eliminated and a specified order for offering the marketing events to the associated candidate. The final ranking list comprising the optimized and sorted marketing events is stored in the database structure 18.

Table 1 illustrates an example of sorted ranking scores with constraint data applied and subtracted from the budget.

TABLE 1

| Ranking score | Constraint data | Budget |
| --- | --- | --- |
| $50 | $10 | $30 |
| $40 | $5 | $20 |
| $30 | $10 | $15 |

TABLE 1-continued

| Ranking score | Constraint data | Budget |
| --- | --- | --- |
| $20 | $5 | $5 |
| $10 | $10 | $0 |

The first row comprises the highest ranked marketing event ($50 rank). The total budget is $30 and the associated constraint data is $10. The constraint data ($10) is subtracted from the budget ($30) for the highest ranked marketing event leaving $20 in the budget for offering more marketing events to the candidate. The second row comprises the next ranked marketing event ($40 rank). The constraint data ($5) is subtracted from the budget ($20) for the next ranked marketing event ($40 rank) leaving $15 in the budget offering more marketing events to the candidate. The optimization tool goes through each ranked marketing event until there is no more money left in the budget (see row 5) thereby eliminating any more offerings for marketing events. The first four rows comprise the marketing events to be offered sequentially to the candidate. The fifth row comprises an eliminated marketing event due to an exhausted budget ($0).

An example of an implementation for the database system 2 of FIG. 1 for dynamically applying data models to candidate(s) with respect to outbound marketing event(s) and optimizing/ordering marketing events for the candidate(s) is described as follows. This example comprises six marketing offers and four channels.

Marketing Offers
1. A Mortgage Offer
2. A Credit Card Offer
3. A Household Insurance Offer
4. An Auto Insurance Offer
5. A Platinum Credit Card
6. A Low Rate Loan Offer Channels
1. Mail
2. Email
3. Outbound Telephone Call
4. Text Message The 6 marketing offers are multiplied by the 4 channels to produce 24 marketing events. Each marketing event comprises a drop date and therefore a calendar of events. A retrieving tool and an application tool (e.g., retrieving tool 7 and application tool 8) are used to retrieve a data model(s) and apply the data model(s) to a first candidate(s) with respect to outbound marketing event(s). The first candidate(s) is scored for each of the 24 marketing events with propensity to respond (i.e., a response probability score) to each of the marketing events. All 24 response probability scores are calculated in parallel using a data model(s) and each score comprises a range between 0 and 1 with 1 comprising the highest propensity to respond to a marketing event and 0 comprising the lowest propensity to respond to a marketing event. Each of the marketing events comprises an expected profit gain (i.e., value score). For example, if the marketing offer is a mortgage offer, the expected profit margin (i.e., value score) may be calculated based on an annual return of repayments vs. infrastructure costs balanced against the risk of the candidate defaulting on the mortgage vs. prepayment of mortgage before the term is up (although the mortgage may be loaded with a prepayment penalty clause to protect a revenue stream). A ranking score for each of the 24 marketing events is calculated as a function of a value score for each marketing event with respect to a response probability score for the associated marketing event with respect to the first candidate. The aforementioned process is performed by a computing tool (e.g., computing tool 6 in FIG. 1). An optimization tool (e.g., optimization tool 12 in FIG. 1) sorts the 24 marketing events from highest ranking scores to lowest ranking scores. The optimization tool applies constraint data including timing constraints and monetary constraints (i.e., verses budget) to the 24 marketing events. The constraint data is applied to the 24 marketing events starting with the highest ranked marketing event to the lowest ranking marketing event and ultimately an optimized execution list is produced comprising a stream of marketing events that the first candidate will receive. As an alternative, the marketing events may be ordered and optimized by the optimization tool 12 without using value scores, response probability scores, and ranking scores. Additionally, the marketing events may be ordered and optimized by the optimization tool 12 using any combination of the value scores, response probability scores, and ranking scores.

Figure 2:
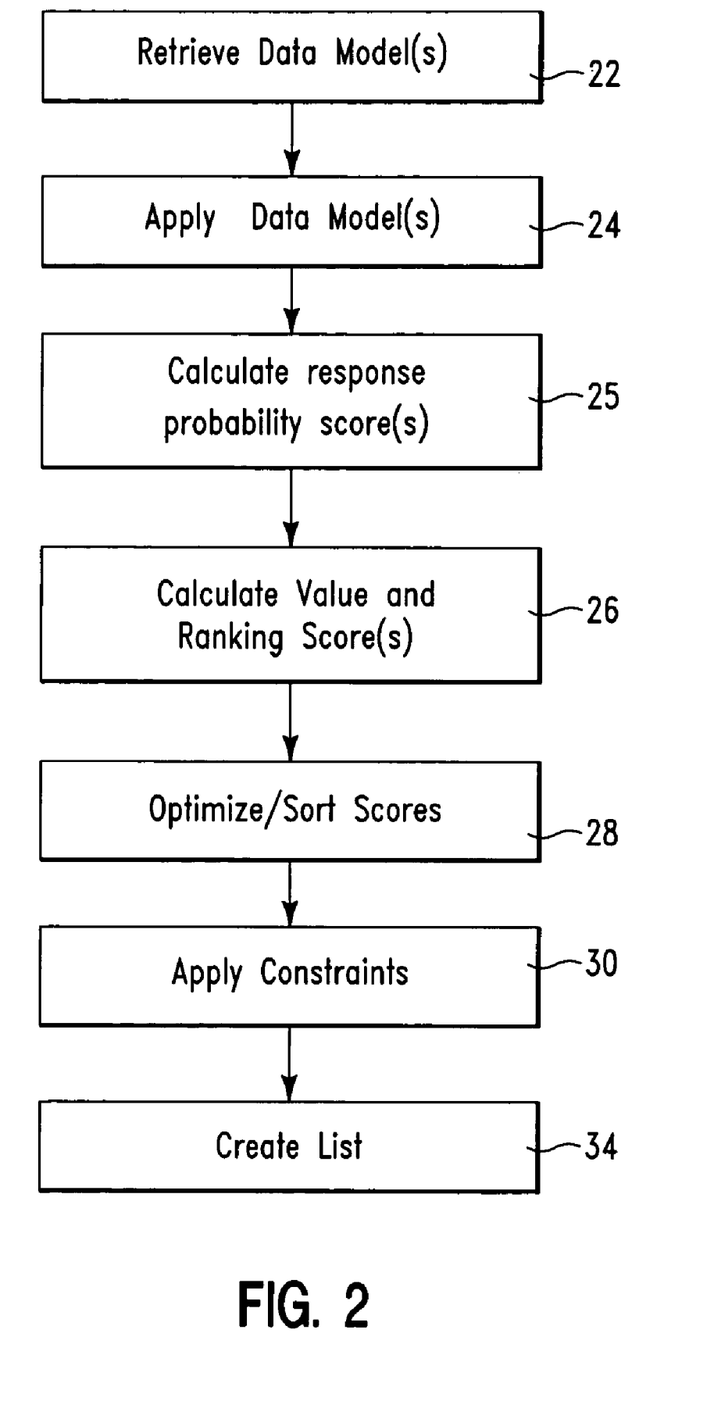
FIG. 2 illustrates a flowchart comprising an algorithm used by database system of FIG. 1 for dynamically applying data models to candidate(s) with respect to marketing event(s) and ordering the marketing events for offering to the candidate(s), in accordance with embodiments of the present invention.

FIG. 2 illustrates a flowchart comprising an algorithm used by database system 2 of FIG. 1 for dynamically applying data models to candidate(s) with respect to marketing event(s) and ordering the marketing events for offering to the candidate(s), in accordance with embodiments of the present invention. In step 22, the retrieving tool 7 retrieves a data model(s) for a first candidate(s). In step 24, the application tool applies the data model(s) to the first candidate(s) with respect to marketing events. In step 25, the computing tool 6 calculates response probability scores for the marketing events with respect to the first candidate(s). In step 26, the computing tool 6 calculates value scores for the marketing events. Additionally, in step 26, ranking scores for the marketing events are calculated by the computing tool 6. In step 28, the optimization tool 12 optimizes/sorts the ranking scores (i.e., for the marketing events) from highest rank to lowest rank for the first candidate(s) and a ranking list is created. In step 30, the optimization tool 12 applies timing constraints to each of the ranking scores for the first candidate. The timing constraints eliminate any marketing events that comprise timing conflicts. Additionally, in step 30, the optimization tool 12 applies monetary constraints to the value scores that remain after the timing constraints have been applied and subtracts the monetary constraints from the predetermined budgeted execution costs for offering the marketing event to the first candidate. In step 34, a final ranking list is created as a result of execution steps 28 and 30. Note that steps 28 and 30 may be performed in any order. The final ranking list comprises marketing events that have not been eliminated (i.e., by timing and monetary constraints). The final ranking list comprises a specified order for offering the marketing events to the first candidate(s). Ranking a plurality of marketing events for the first candidate(s) may be done in parallel. Additionally, ranking a plurality of marketing events for a plurality of candidates may be done in simultaneously in parallel.

Figure 3:
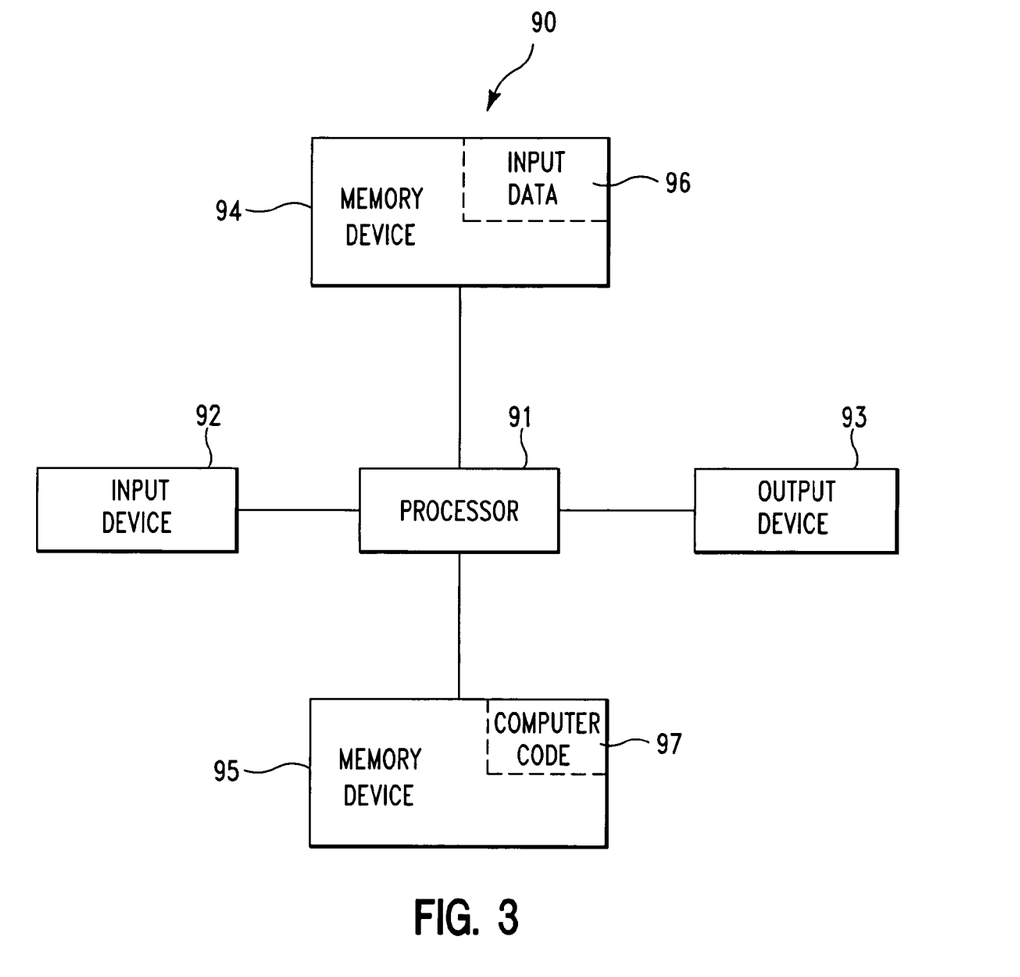
FIG. 3 illustrates a computer system used for implementing the database system of FIG. 1 for dynamically applying data models to candidate(s) with respect to marketing event(s) and ordering the marketing events for offering to the candidate(s), in accordance with embodiments of the present invention.

FIG. 3 illustrates a computer system 90 used for implementing the database system 2 of FIG. 1 for dynamically applying data models to candidate(s) with respect to marketing event(s) and ordering the marketing events for offering to the candidate(s), in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes an algorithm for dynamically applying data models to candidate(s) with respect to marketing event(s) and ordering the marketing events for offering to the candidate(s). The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 3) may comprise the database system 2 of FIG. 1 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

Thus the present invention discloses a process for deploying or integrating computing infrastructure, comprising integrating computer-readable code into the computer system 90, wherein the code in combination with the computer system 90 is capable of performing a method used for dynamically applying data models to candidate(s) with respect to marketing event(s) and ordering the marketing events for offering to the candidate(s).

While FIG. 3 shows the computer system 90 as a particular configuration of hardware and software, any configuration of hardware and software, as would be known to a person of ordinary skill in the art, may be utilized for the purposes stated supra in conjunction with the particular computer system 90 of FIG. 3. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A database system comprising a computer processor coupled to a computer-readable memory unit, said database system comprising a database manager software application stored on a computer readable medium, a first database structure storing a first list of candidates, a second database structure storing a plurality of data models, and a third database structure storing a second list identifying marketing events and a third list of calculated value scores associated with the marketing events, wherein said database manager software application comprises a retrieving tool, a computing tool, an optimization tool, and an application tool, wherein each marketing event from said second list comprises a marketing offer and an identified channel means for communicating said marketing offer, and wherein said value scores are associated with an expected profit gain associated with each said marketing offer, said memory unit comprising instructions that when executed by the computer processor implements a method comprising;

retrieving by said retrieving tool, at least one data model from said plurality of data models in said second database structure;

applying by said application tool, said at least one data model to at least one candidate from said first list of candidates with respect to a first marketing event from said second list;

applying, by said optimization tool, constraint data to said marketing events, wherein said constraint data comprises first data and second data, wherein said first data consists of an amount of money regarding execution costs for offering said marketing events to said at least one candidate, wherein said second data consists of budgetary data regarding a total budgeted amount allotted for offering all of said marketing events, and wherein said execution costs comprise costs for promotional materials, mailing costs, and telemarketing costs;

receiving, by said computing device, timing constraints associated with offering successive marketing events comprising a same type of marketing offer;

first determining, by said optimization tool in response to said receiving said timing constraints, that said first marketing event of said marketing events comprises a same type of marketing offer as a marketing offer comprised by a second marketing event of said marketing events;

second determining, by said optimization tool in response to said receiving said timing constraints, that a timing conflict exists between offering said first marketing event and offering said second marketing event;

eliminating, by said optimization tool from said second list in response to said first determining and said second determining, said first marketing event;

computing, by said computing tool, response probability scores for said marketing events and all of said candidates, wherein each of said response probability scores are computed using said at least one data model; and computing by said computing tool, a ranking score for each of said marketing events for all of said candidates, wherein each of said ranking scores is computed by multiplying a value score from said third list with an associated response probability score of said response probability scores; and generating, by said computer processor, a final ranking list comprising each of said marketing events in a specified order associated with said ranking scores, wherein said final ranking list does not comprise said first marketing event.

2. The database system of claim 1, wherein said application tool is for applying a specified constraint to said first marketing event with respect to said at least one candidate.

3. The database system of claim 2, wherein said specified constraint comprises a timing conflict related to offering said first marketing event to said at least one candidate.

4. The database system of claim 2, wherein said wherein said specified constraint comprises a budget constraint related to offering said first marketing event to said at least one candidate.

5. The database system of claim 1, wherein said first list of candidates comprises existing customers of an entity that is offering said marketing events from said second list.

6. The database system of claim 1, wherein each marketing offer is selected from the group consisting of a product offer and a service offer.

7. The database system of claim 1, wherein each identified channel means is selected from the group consisting of a telephone call, an email, a text message, and standard mail.

8. A selection method, comprising:

providing a database system comprising a database manager software application stored on a computer readable medium, a first database structure storing a first list of candidates, a second database structure storing a plurality of data models, and a third database structure storing a second list identifying marketing events and a third list of calculated value scores associated with the marketing events, wherein said database manager software application comprises a retrieving tool, a computing tool, an optimization tool, and an application tool, wherein each marketing event from said second list comprises a marketing offer and an identified channel means for communicating said marketing offer, and wherein said value scores are associated with an expected profit gain associated with each said marketing offer;

retrieving by said retrieving tool, at least one data model from said data models in said second database structure;

applying by said application tool, said at least one data model to at least one candidate from said first list of candidates with respect to a first marketing event from said second list;

applying, by said optimization tool, constraint data to said marketing events, wherein said constraint data comprises first data and second data, wherein said first data consists of an amount of money regarding execution costs for offering said marketing events to said at least one candidate, wherein said second data consists of budgetary data regarding a total budgeted amount allotted for offering all of said marketing events, and wherein said execution costs comprise costs for promotional materials, mailing costs, and telemarketing costs;

receiving, by said computing device, timing constraints associated with offering successive marketing events comprising a same type of marketing offer;

first determining, by said optimization tool in response to said receiving said timing constraints, that said first marketing event of said marketing events comprises a same type of marketing offer as a marketing offer comprised by a second marketing event of said marketing events;

second determining, by said optimization tool in response to said receiving said timing constraints, that a timing conflict exists between offering said first marketing event and offering said second marketing event;

eliminating, by said optimization tool from said second list in response to said first determining and said second determining, said first marketing event;

computing, by said computing tool, response probability scores for said marketing events and all of said candidates, wherein each of said response probability scores are computed using said at least one data model; and computing by said computing tool, a ranking score for each of said marketing events for all of said candidates, wherein each of said ranking scores is computed by multiplying a value score from said third list with an associated response probability score of said response probability scores; and generating, by a computer processor of said database system, a final ranking list comprising each of said marketing events in a specified order associated with said ranking scores, wherein said final ranking list does not comprise said first marketing event.

9. The method of claim 8, further comprising applying by said application tool, a specified constraint to said first marketing event with respect to said at least one candidate.

10. The method of claim 9, wherein said specified constraint comprises a timing conflict related to offering said first marketing event to said at least one candidate.

11. The method of claim 9, wherein said specified constraint comprises a budget constraint related to offering said first marketing event to said at least one candidate.

12. The method of claim 8, wherein said first list of candidates comprises existing customers of an entity that is offering said marketing events from said second list.

13. The method of claim 8, wherein each marketing offer is selected from the group consisting of a product offer and a service offer.

14. The method of claim 8, wherein each identified channel means is selected from the group consisting of a telephone call, an email, a text message, and standard mail.

15. A computer-executable program product comprising computer executable instructions tangibly embodied on a computer readable medium that when executed by said computer perform the method steps comprising an algorithm adapted to implement a selection method within a database system, said database system comprising a database manager software application stored on a computer readable medium, a first database structure storing a first list of candidates, a second database structure storing a plurality of data models, and a third database structure storing a second list identifying marketing events and a third list of value scores associated with the marketing events, wherein said database manager software application comprises a retrieving tool, a computing tool, an optimization tool, and an application tool, wherein each marketing event from said second list comprises a marketing offer and an identified channel means for communicating said marketing offer, and wherein said value scores are associated with an expected profit gain associated with each said marketing offer, said method comprising the steps of:

retrieving by said retrieving tool, at least one data model from said data models in said second database structure;

applying by said application tool, said at least one data model to at least one candidate from said first list of candidates with respect to a first marketing event from said second list;

applying, by said optimization tool, constraint data to said marketing events, wherein said constraint data comprises first data and second data, wherein said first data consists of an amount of money regarding execution costs for offering said marketing events to said at least one candidate, wherein said second data consists of budgetary data regarding a total budgeted amount allotted for offering all of said marketing events, and wherein said execution costs comprise costs for promotional materials, mailing costs, and telemarketing costs;

receiving, by said computing device, timing constraints associated with offering successive marketing events comprising a same type of marketing offer;

first determining, by said optimization tool in response to said receiving said timing constraints, that said first marketing event of said marketing events comprises a same type of marketing offer as a marketing offer comprised by a second marketing event of said marketing events;

second determining, by said optimization tool in response to said receiving said timing constraints, that a timing conflict exists between offering said first marketing event and offering said second marketing event;

eliminating, by said optimization tool from said second list in response to said first determining and said second determining, said first marketing event;

computing, by said computing tool, response probability scores for said marketing events and all of said candidates, wherein each of said response probability scores are computed using said at least one data model; and computing by said computing tool, a ranking score for each of said marketing events for all of said candidates, wherein each of said ranking scores is computed by multiplying a value score from said third list with an associated response probability score of said response probability scores; and generating, by a computer processor of said database system, a final ranking list comprising each of said marketing events in a specified order associated with said ranking scores, wherein said final ranking list does not comprise said first marketing event.

16. The computer program product of claim 15 wherein said method further comprises applying by said application tool, a specified constraint to said first marketing event with respect to said at least one candidate.

17. The computer program product of claim 16, wherein said specified constraint comprises a timing conflict related to offering said first marketing event to said at least one candidate.

18. The computer program product of claim 16, wherein said specified constraint comprises a budget constraint related to offering said first marketing event to said at least one candidate.

19. The computer program product of claim 15, wherein said first list of candidates comprises existing customers of an entity that is offering said marketing events from said second list.

20. The computer program product of claim 15, wherein each marketing offer is selected from the group consisting of a product offer and a service offer.

21. The computer program product of claim 15, wherein each identified channel means is selected from the group consisting of a telephone call, an email, a text message, and standard mail.

22. The method of claim 8, further comprising:

removing, by said optimization tool from said third list, a third marketing event of said first group; and reallocating, by said optimization tool, monetary funds associated with said third marketing event to a fourth market event of said first group.

* * * * *